J. F. H. FECHTENBURG.
SPEED REGULATING DEVICE FOR TALKING MACHINES.
APPLICATION FILED AUG. 3, 1916.
1,216,222.
Patented Feb. 13, 1917.
7 SHEETS—SHEET 3.
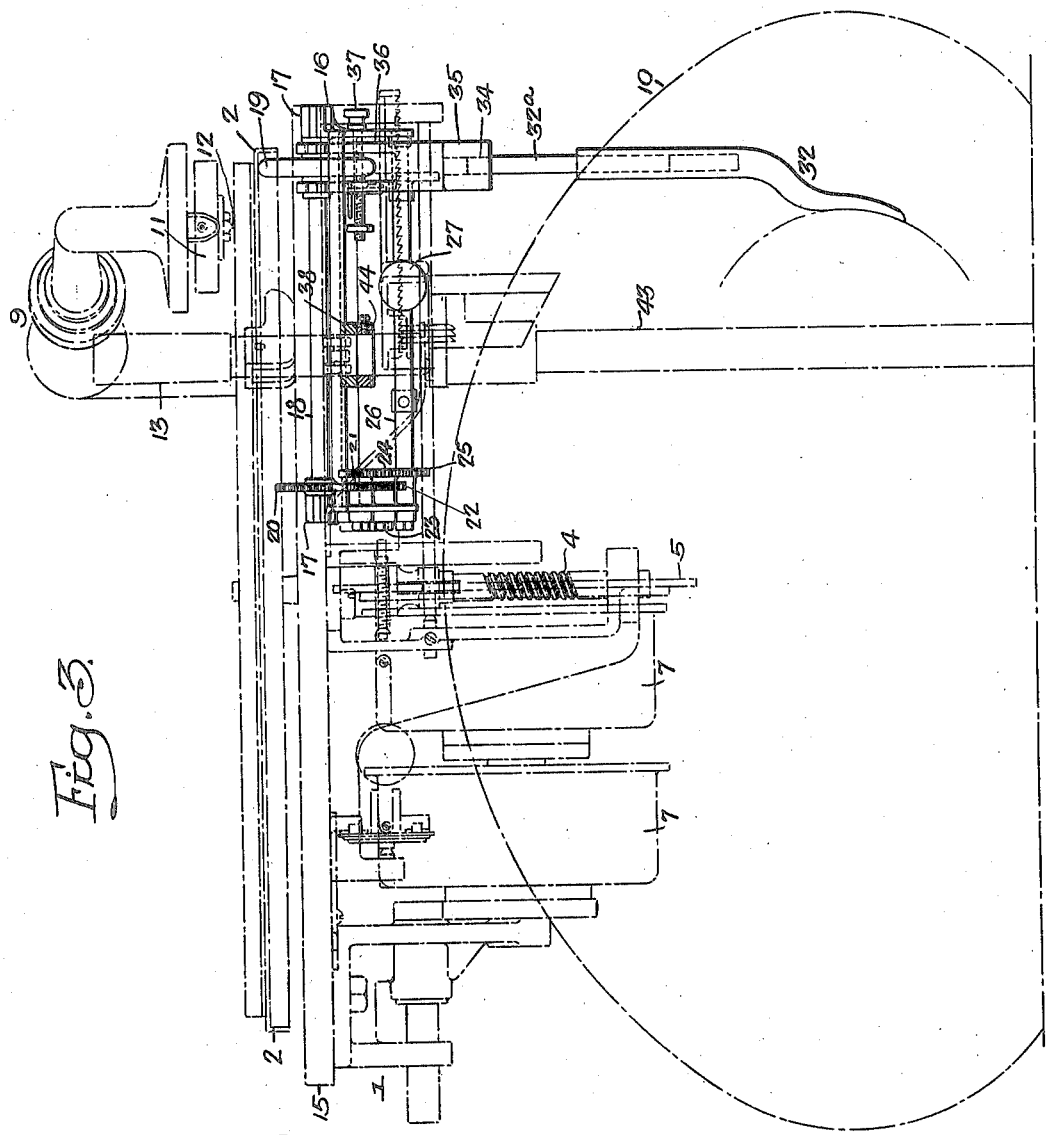
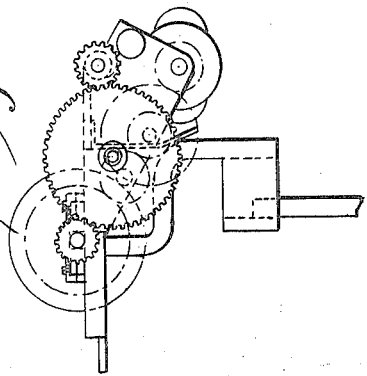
Inventor—
Jörgen F. H. Fechtenburg.
by his Attorneys J. F. H. FECHTENBURG.
SPEED REGULATING DEVICE FOR TALKING MACHINES.
APPLICATION FILED AUG. 3, 1916.
1,216,222.
Patented Feb. 13, 1917.
7 SHEETS—SHEET 4.
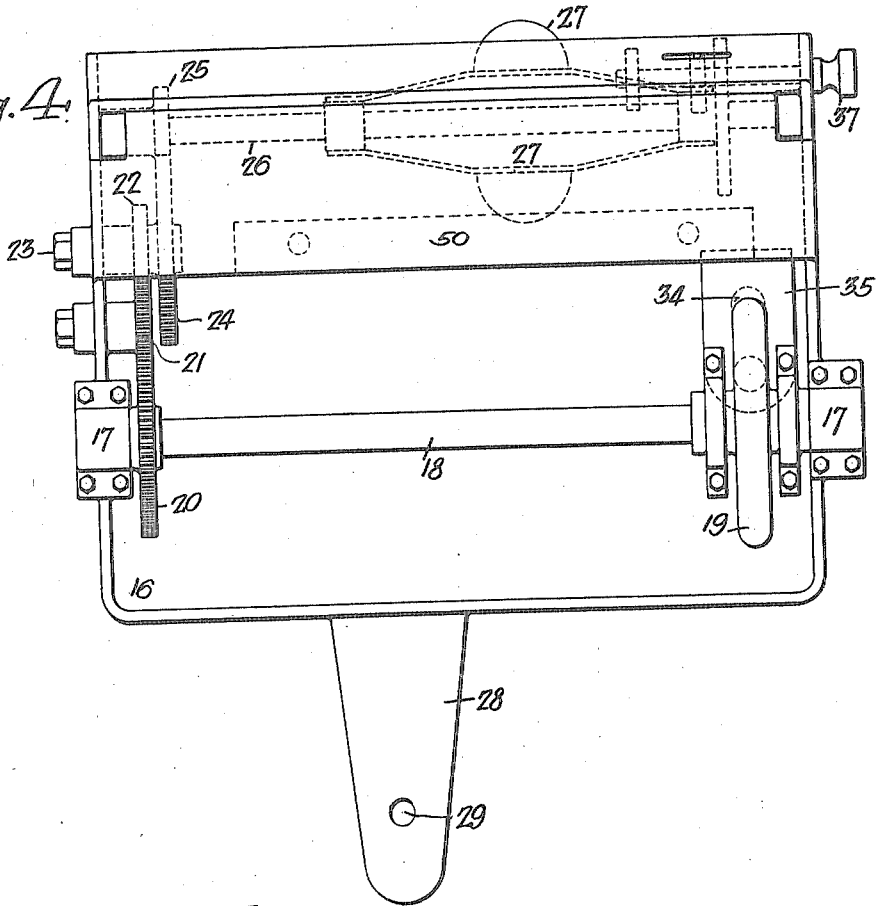
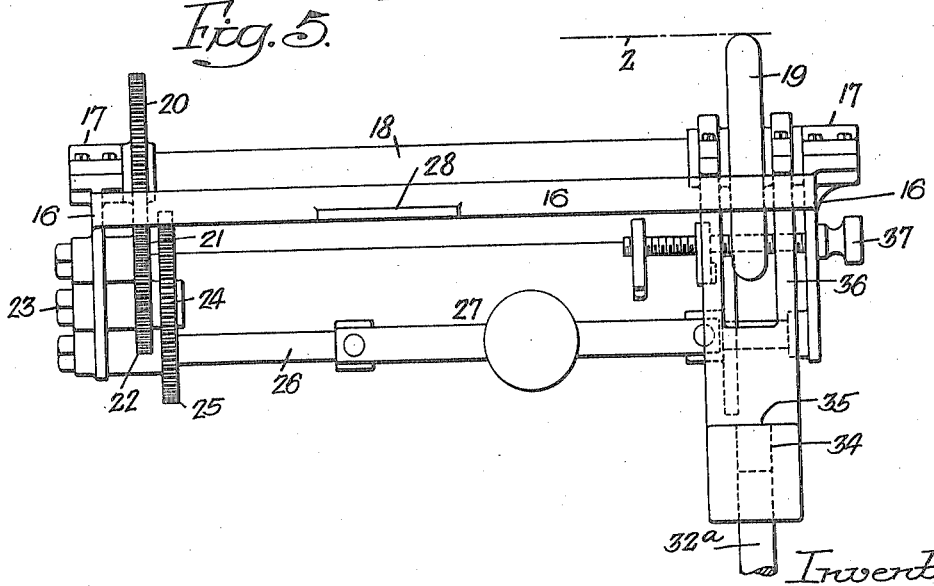

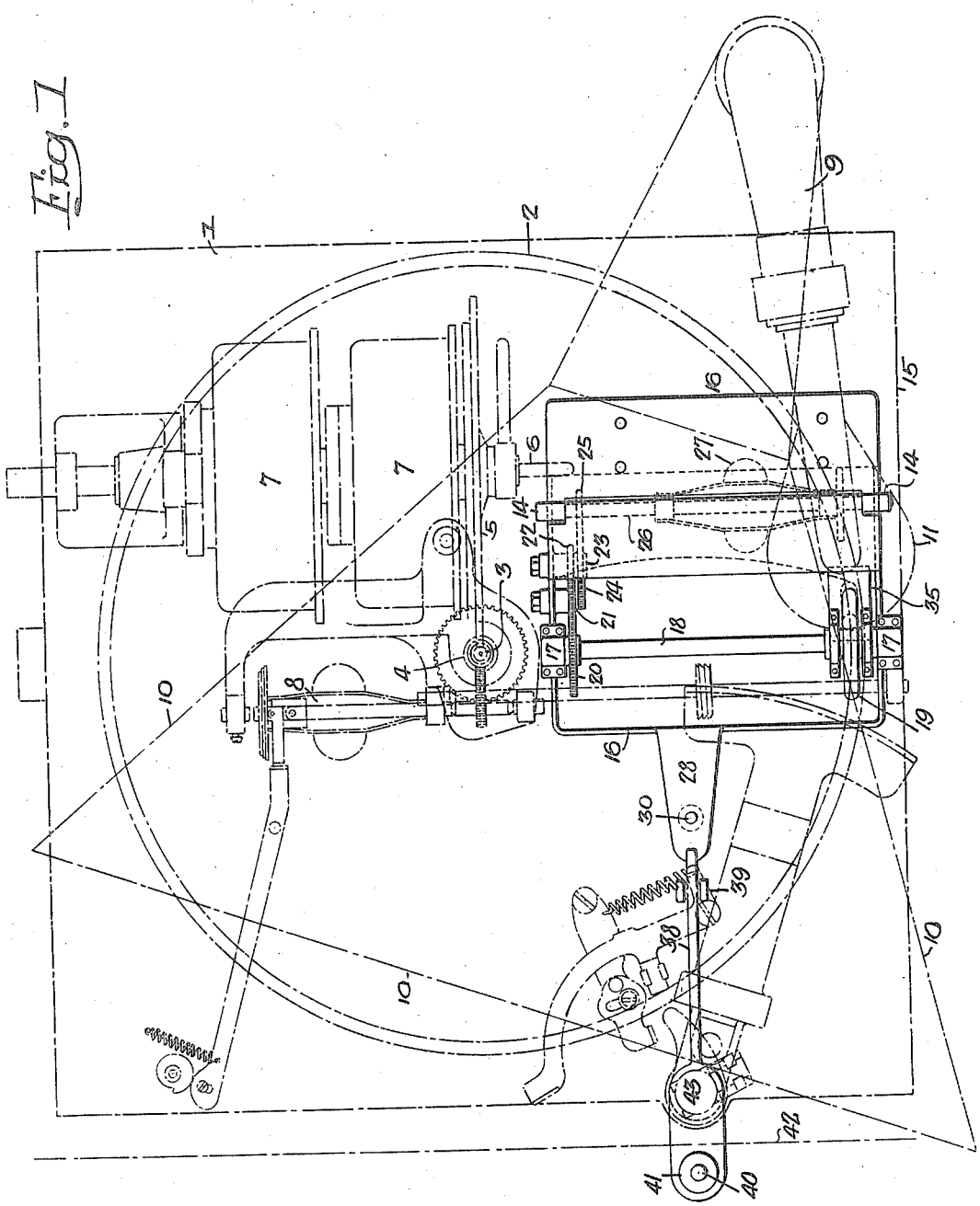

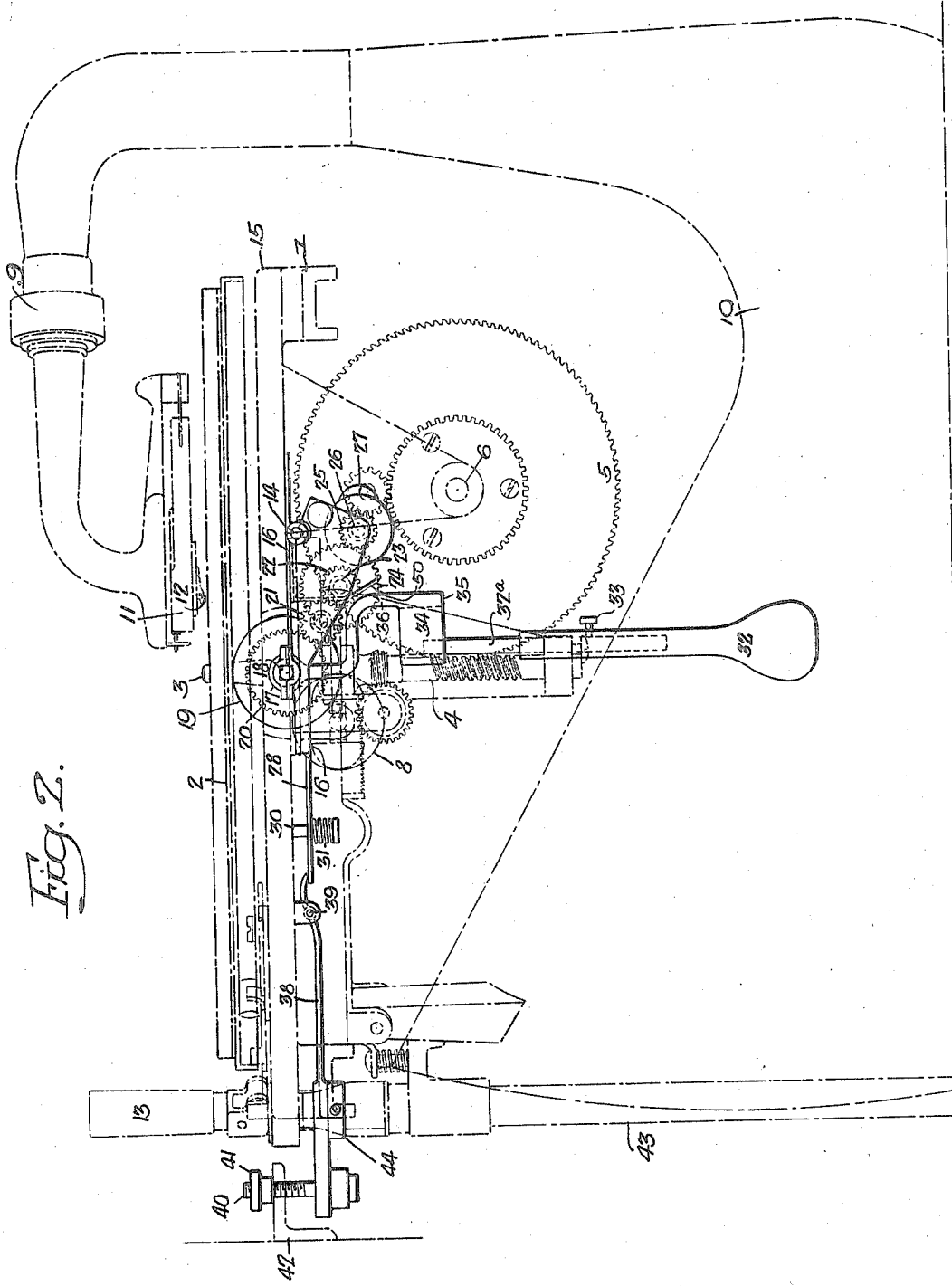

J. F. H. FECHTENBURG.
SPEED REGULATING DEVICE FOR TALKING MACHINES.
APPLICATION FILED AUG. 3, 1916.

1,216,222.

Patented Feb. 13, 1917.
7 SHEETS—SHEET 5.

Inventor—
Jörgen F. H. Fechtenburg.
by his Attorneys.
Howson Howson

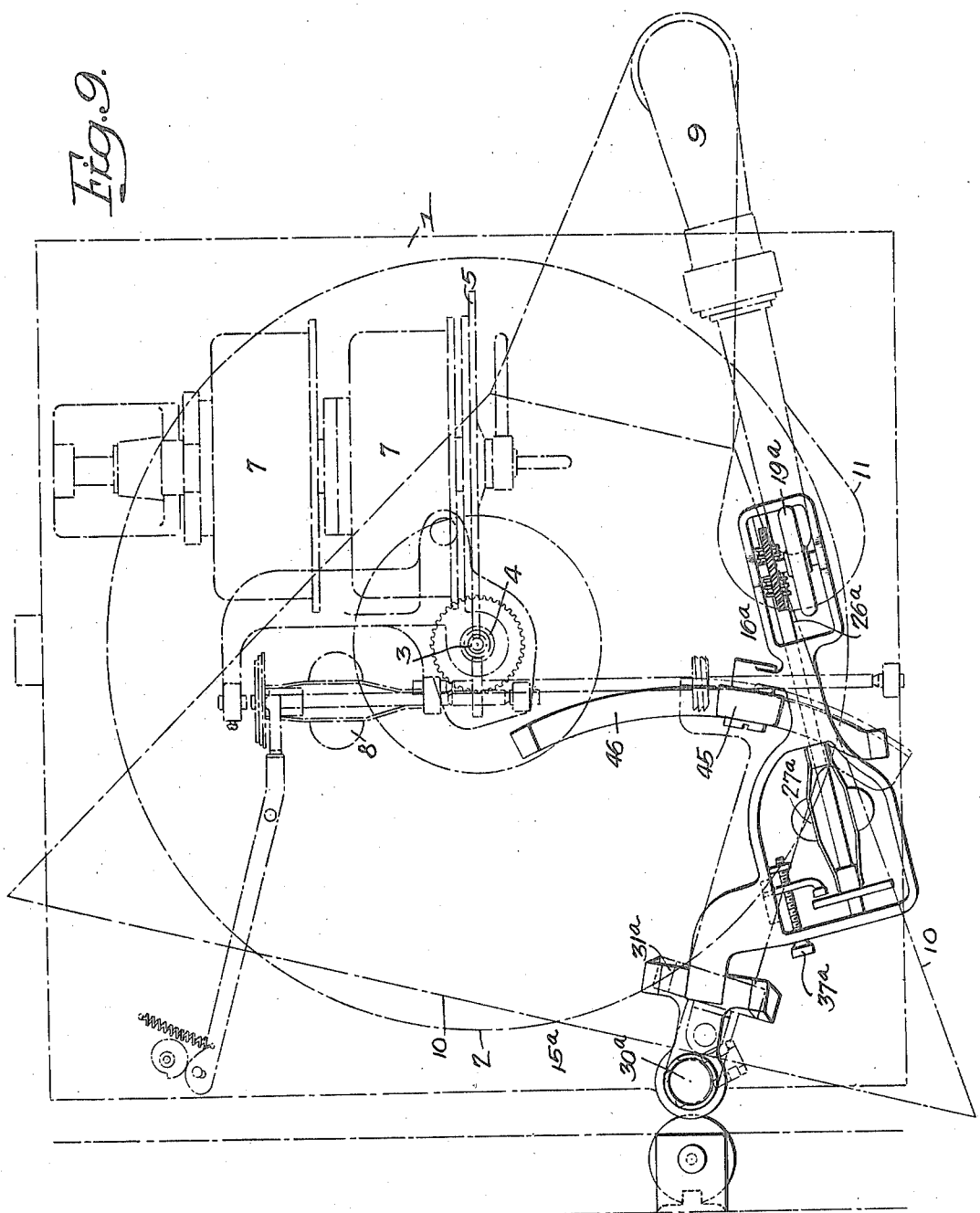

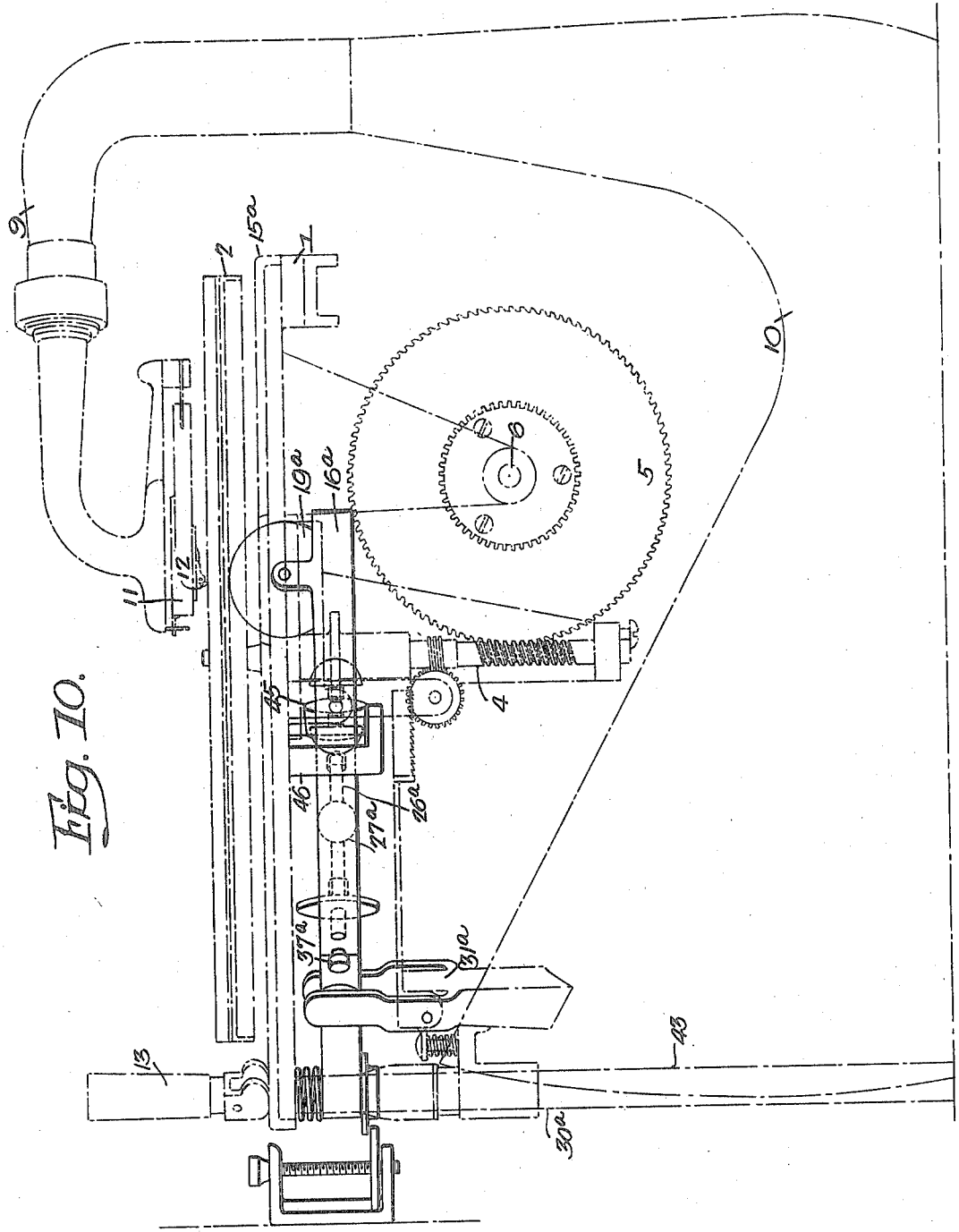

UNITED STATES PATENT OFFICE.

JÖRGEN F. H. FECHTENBURG, OF PHILADELPHIA, PENNSYLVANIA.

SPEED-REGULATING DEVICE FOR TALKING-MACHINES.

1,216,222. Specification of Letters Patent. Patented Feb. 13, 1917.

Application filed August 3, 1916. Serial No. 112,982.

*To all whom it may concern:*

Be it known that I, JÖRGEN F. H. FECHTENBURG, a citizen of the United States, residing in Philadelphia, Pennsylvania, have invented certain Improvements in Speed-Regulating Devices for Talking-Machines, of which the following is a specification.

My invention relates to certain improvements in talking machines, particularly of the disk type in which a disk is carried by a turn table which travels under a tone arm.

One object of my invention is to increase the capacity of machines of this type by regulating the speed of the turn table so that the surface speed at the point of contact of the stylus with the record will be the same throughout the entire width of the turn table.

A further object of the invention is to provide a friction speed regulator for accomplishing the above purpose.

A still further object of the invention is to arrange this friction speed regulator so that when the tone arm is raised for the purpose of changing a record the friction speed regulator is lowered so as to allow the turn table to be entirely free of the mechanism.

In the accompanying drawings:

Figure 1, is a plan view showing a talking machine of the "Edison" type in dotted lines and my improvement in full lines;

Fig. 2, is a side view of the same;

Fig. 3, is an end view;

Fig. 4, is a plan view of my improved mechanism detached from the talking machine;

Fig. 5, is an end view of the mechanism;

Fig. 9, is a plan view illustrating a modification of my invention,

Fig. 10, is a side view of the same, and

Figs. 11 and 12 are views of modifications of my invention.

Figure 6:
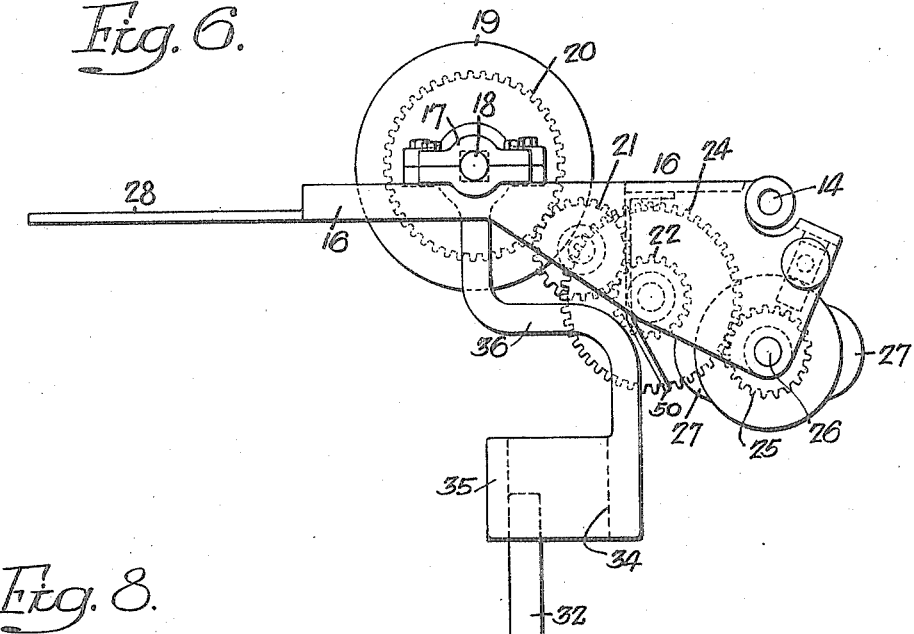
Fig. 6, is a side view of the mechanism.

1 is the frame of the phonograph. 2 is the turn table mounted on a pivot 3 and driven by the driving mechanism 4 and 5 consisting of a worm and worm wheel, the wheel being mounted on a shaft 6 of a motor 7. 8 is a governor for controlling the speed of the turn table and this governor is geared to the spindle by a worm and worm wheel connection. 9 is the tone arm. 10 is the horn. 11 is the sound box or reproducer on the end of the tone arm carrying the stylus 12 which travels in the groove of the disk or record. 13 is the handled cam for depressing the reproducer so as to bring the stylus into active position. All of this mechanism is common to the type of talking machine mentioned above.

The turn tables of disk talking machines are always driven at the same rate of speed, consequently the periphery of the turn table turns at a greater surface speed than that portion near the center and the impression on the disk is coarser at the periphery than at the center to allow for this change of speed.

By my invention, I so govern the speed of the turn table that the surface speed is always the same, consequently a greater length of record can be accommodated with a given diameter of disk than can be accommodated by the ordinary method because I provide means for controlling the surface travel of the turn table. Therefore, the surface speed of the turn table and the disk carried thereby is the same at the outer edge as it is near the center. This I accomplish in the following manner:

Pivotally mounted at 14 on the supporting plate 15 of the machine is a frame 16 having bearings 17 for a squared shaft 18 on which slides the pressure roller 19 having a rounded bearing surface which rests against the under side of the turn table 2. At the opposite end of the shaft 18 from the roller 19, in the present instance, is a gear wheel 20 which meshes with a pinion 21 which, in turn, meshes with a pinion 22 on a shaft 23 carrying a gear wheel 24, which meshes with a pinion 25 on a shaft 26 on which is a governor 27 of a construction usual in this type of machine. This governor can be regulated in the same manner as the ordinary talking machine governor now in use. An oil guard 50 is located between the roller 19 and the governor, as shown, to prevent the governor splashing oil on the wheel.

The frame 16 has an extension 28 having a perforation 29 through which passes the pivot pin 30 which is secured to the plate 15 of the machine, and between the head of this pin and the extension is a spring 31 tending to lift the plate and hold the roller against the bottom of the turn table 2. The position of the roller 19 on the shaft 18 is controlled by the horn 10. 32 is an arm secured to the horn and has an adjustable extension 32ᵃ held by a set screw 33. This extension enters a slot 34 in the portion 35 of the depending bearing 36, which is arranged to receive the trunnions of the roller 19.

By this construction when the horn moves on its pivot so as to carry the stylus over the record, the roller 19 is moved with it so that it always assumes a correct position in respect to the stylus. The governor can be set to any position by an adjusting screw 37 so as to regulate the speed of the shaft 18 and its roller 19. Thus, as the stylus travels from the periphery toward the center the amount of retardation is lessened, and, consequently, a much longer record can be produced on the disk than in the present type of machine.

When it is desired to move the friction roller 19 out of action, I tilt the frame on its pivot 14 by a lever 38, which is pivoted at 39 to the plate 15 and has a short arm which extends over the projection 28 of the frame 16. At the outer end of the arm of the lever is a screw 40 on which is a nut 41 which rests on a bracket 42 secured to the casing of the machine, so that on turning this nut in one direction the arm carrying the screw 40 is raised while the other arm is depressed, forcing the frame 16 down against the pressure of the spring 31 and drawing the roller 19 away from the turn table.

I also provide means for releasing the turn table from the control of the roller 19 when the handled cam 13 is turned on its pivot to raise the stylus. The horn 10 carrying the tone arm and stylus is mounted on a vertical pivot 43, and the vertical position of the parts carried by the horn is controlled by the cam lever 13 which, when turned, will bear upon the plate 15, lifting the horn and the portions connected thereto so that the stylus will be clear of the disk.

Secured to the vertical pivot 43 is a collar 44 which is located under the lever 38, so that when the cam lever 13 is turned to raise the pivot 43 and the stylus the lever 38 will be turned on its pivot 39 and will depress the frame 16 so as to withdraw the roller 19 from contact with the under side of the turn table.

Figure 8:
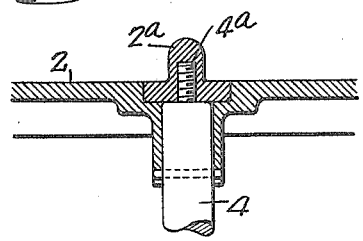
Fig. 8, shows a nut for holding the turn table onto the spindle.
Figure 7:
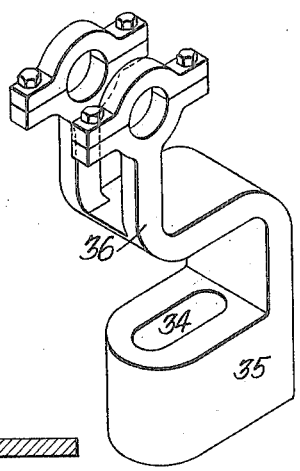
Fig. 7, is a perspective view of one of the bearings.

In order to prevent the turn table from lifting off of its driving spindle 4, I provide a nut 2ᵃ, (Fig. 8) which is adapted to a threaded extension 4ᵃ of the spindle and the flange of the nut rests in a recess in the turn table. By this construction, the turn table is held against vertical movement on the spindle.

In Figs. 9 and 10 I have illustrated a modification in which the wheel 19ᵃ is mounted on the frame 16ᵃ, which is pivoted at 30ᵃ, and the frame is moved by an arm 31ᵃ on the horn. The wheel 19ᵃ drives the governor shaft 26ᵃ through a right angled gear or worm gear, as shown in Fig. 9, and the governor 27ᵃ is controlled by an adjusting screw 37ᵃ. On the frame 16ᵃ is a wheel 45 which travels on a segmental track 46 secured to the under side of the frame 15ᵃ. The pivot 30ᵃ is the same pivot on which the horn is mounted so that the bearing portion of the roller 19ᵃ is always directly under the stylus irrespective of the position of the horn.

In some instances, the roller instead of being a retarding roller may be a driving roller as at 19ᵃ for driving the turn table, as shown in Fig. 11, the motor, in this case, being geared directly to the shaft on which the wheel is mounted. The turn table is then driven by friction from the underside instead of being driven from the center bearing as in the drawings.

Figure 12:
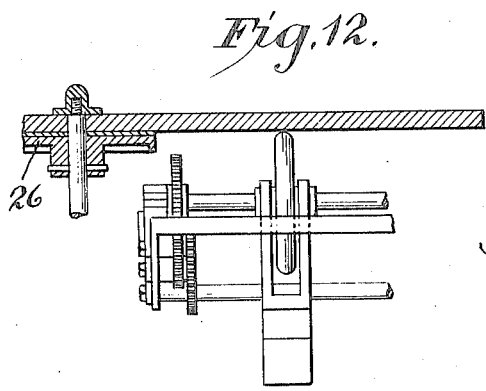

In some instances, as shown in Fig. 12, the disk may overhang the turn table which may be simply a comparatively small hub, as at 26; in this case the roller will bear upon the disk which, in fact, becomes the turn table.

While my invention is particularly adapted for use in records in which the reproductions are all of the same length irrespective of the position of the record on the disk, by moving my improved mechanism out of contact with the turn table the ordinary records can be used.

I claim:—

1. The combination in a talking machine, of a turn table; a horn; a sound box having a stylus carried thereby; a roller bearing upon the turn table; means for causing the roller to move with the horn, and means for regulating the speed of the roller so that the surface speed of the disk carried by the turn table at the stylus will be the same throughout the length of the record.

2. The combination in a talking machine, of a turn table; a reproducer; a roller bearing against the turn table; means for driving the roller at a given speed, and means for moving the roller in unison with the movement of the reproducer.

3. The combination in a talking machine, of a turn table; means for holding the turn table against vertical movement; a tone arm, sound box and stylus located above the turn table; a frame located under the table; a roller carried by the frame and bearing against the under side of the turn table; means for driving the roller at a given speed, and means for moving the roller under the turn table in unison with the movement of the stylus across the table.

4. The combination in a talking machine, of a turn table; a tone arm, sound box and stylus; a frame; a roller carried by the frame and bearing against the under side of the turn table; means for driving the roller at a given speed; and means for moving the roller under the turn table in unison with the movement of the stylus.

5. The combination in a talking machine, of a turn table; a tone arm; a sound box and stylus; a frame pivotally mounted on the under side of the turn table and having a roller; a shaft; a roller mounted on the shaft and arranged to bear on the under side of the turn table; a governor for regulating the speed of the roller, and means connecting the frame with the tone arm so that the two will travel in unison toward and from the center of rotation of the turn table, the roller and its governor regulating the speed of the turn table.

6. The combination in a talking machine, of a turn table; a tone arm, a sound box mounted thereon; a frame pivoted under the turn table; a shaft mounted thereon; a roller on the shaft bearing against the under side of the turn table; a governor geared to the roller so as to regulate its speed, and means for moving the roller into and out of contact with the turn table.

7. The combination in a talking machine, of a turn table; a pivoted horn; a tone arm; a sound box thereon; a frame pivotally mounted under the turn table; a shaft mounted on the frame; a governor geared to the shaft; means for regulating the governor; a roller arranged to turn with but to move longitudinally on the shaft, and means for controlling the position of the roller on the shaft, said means being connected to the pivotally mounted horn.

8. The combination in a talking machine, of a pivoted turn table; a pivoted horn carrying at its upper end a tone arm; a sound box extending over the turn table; means for driving the turn table at a given speed; a roller bearing against the under side of the turn table; a governor controlling the speed of the roller; a frame carrying the roller; means for traversing the roller under the turn table in unison with the movement of the sound box over the turn table, the said roller and its governor retarding the turn table so that the surface speed at the reproducer will be the same throughout the diameter of the turn table.

JÖRGEN F. H. FECHTENBURG.